Sept. 24, 1929.  A. F. KARLSON  1,729,074
HUMIDIFYING SYSTEM
Filed March 5, 1928    4 Sheets-Sheet 2

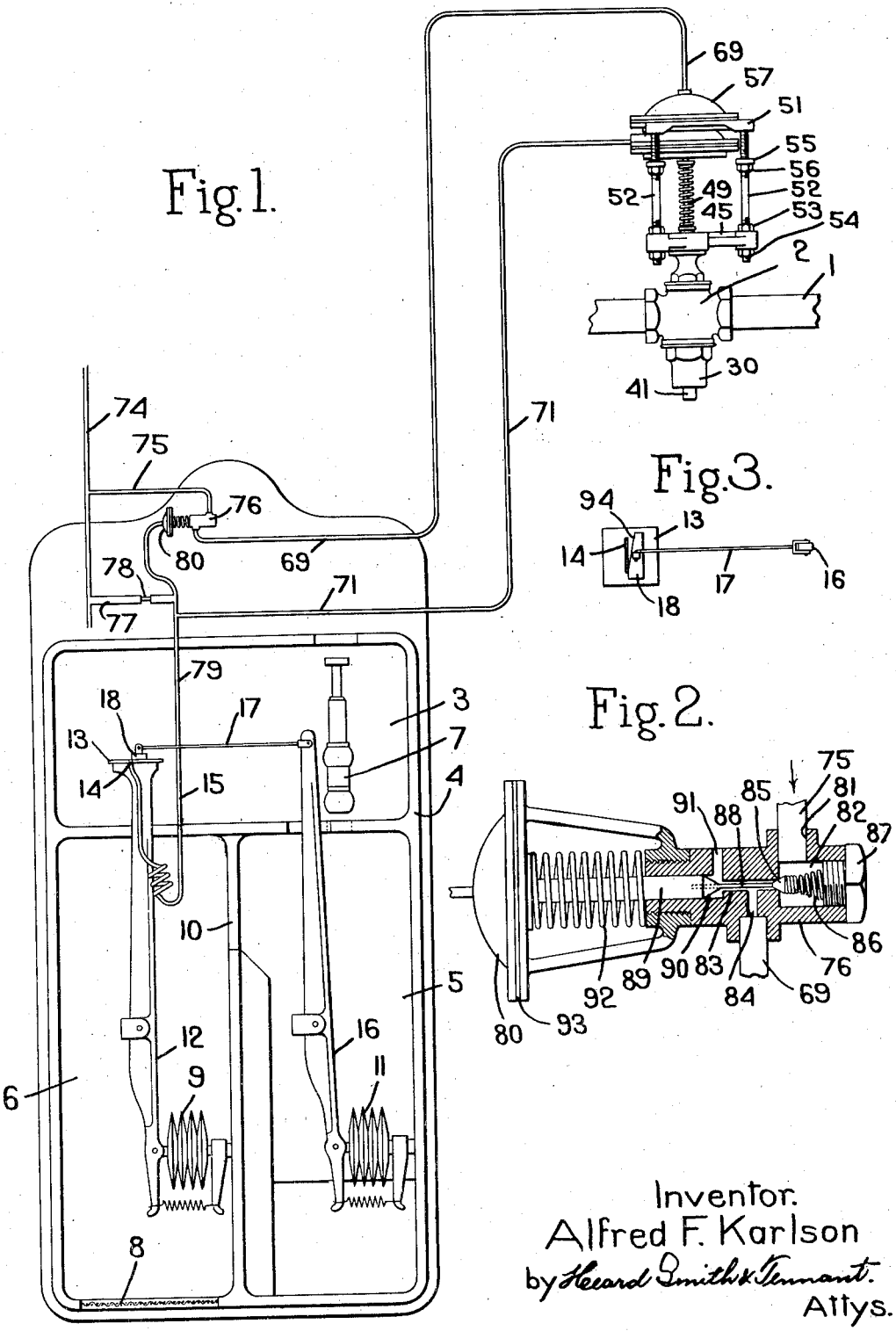

Inventor.
Alfred F. Karlson
by Heard Smith & Tennant.
Attys.

Sept. 24, 1929.　　　　A. F. KARLSON　　　　1,729,074
HUMIDIFYING SYSTEM
Filed March 5, 1928　　　4 Sheets-Sheet 4

Inventor.
Alfred F. Karlson
by Heard Smith & Tennant.
Attys.

Patented Sept. 24, 1929

1,729,074

UNITED STATES PATENT OFFICE

ALFRED F. KARLSON, OF NORTH LEOMINSTER, MASSACHUSETTS, ASSIGNOR TO PARKS-CRAMER COMPANY, OF BOSTON, MASSACHUSETTS, A CORPORATION OF MASSACHUSETTS

HUMIDIFYING SYSTEM

Application filed March 5, 1928. Serial No. 259,125.

This invention relates to improvements in humidifying systems and the principal object thereof is to provide a humidifying system comprising means for supplying moisture to the air and regulating means responsive to variations in the moisture content of the air, with means for controlling the moisture supplying means operable by the regulating means to compensate the moisture deficit from a desired constant condition of humidity within a predetermined, preferably adjustable, limit, and with means also operable by said regulating means thereafter to increase the supply of moisture in response to continued, or to increasing moisture deficit beyond said predetermined limit.

In usual humidity regulation the moisture supplying means is controlled by a regulator which is actuated upon detection of a moisture deficit from a desired constant condition of humidity to supply moisture in excess of that required to maintain a substantially constant desired condition of humidity and when sufficient moisture has been supplied to produce the desired constant condition of humidity, or an amount slightly in excess thereof to cut off the moisture supply until the atmospheric conditions again produce a deficit of moisture, whereupon the supply of moisture is again resumed.

One of the objects of the present invention is to provide a humidifying system with means for supplying moisture to the air, either gradually or preferably at a constant predetermined rate sufficient to compensate the deficit of moisture within a predetermined limit, and thereafter gradually to supply an increasing amount of moisture to the air if the deficit of moisture exceeds said predetermined limit. Desirably also means are provided thus gradually to increase the supply of moisture in correlation to, and in compensation of, an increasing deficit of humidity exceeding said predetermined limit.

A further object of the invention is to provide a humidifying system having regulating means, with means operable by the regulating means to control the supply of moisture acting in a plurality of stages during certain of which moisture is supplied at a substantially constant predetermined rate and during another, or others, of which the moisture is supplied at a progressively increasing rate.

The present invention in its broad sense may be applied to any means for supplying moisture to the atmosphere, such as that of a room or other enclosure, in which a substantially constant desired condition of humidity is to be maintained by providing suitable means for controlling the supply of moisture with a plurality of means operable by suitable regulating means in successive stages, first, to supply uniformly, gradually, or otherwise, a sufficient amount of moisture to compensate the moisture deficit from the desired condition of humidity within a predetermined limit, and thereafter preferably gradually to supply an additional amount of moisture up to the full capacity, if necessary, of the humidifying system. Obviously such apparatus will operate reversely as the deficit of moisture is reduced by the moisture supplied and absorbed by the air of the enclosure.

Any suitable means may be employed which is responsive to variations in the moisture content of the air, such as hygroscopic or preferably thermostatic regulating means which is responsive to variations in the wet and dry bulb temperatures of the air. Such regulating means may be employed to maintain a constant condition of humidity, either absolute humidity, relative humidity, a constant wet bulb depression, or a uniform condition of regain such as cotton regain, silk regain, or that of other hygroscopic materials. The term "desired condition of humidity" is employed herein in a broad sense.

Preferred embodiments of the invention are illustrated in the accompanying drawings, comprising a moisture supplying means in the form of a conduit provided with a regulating valve with a plurality of motors controlled by the regulator for actuating the valve in stages, first, partially to open, and later more fully to open the valve. The conduit which is illustrated may be either a conduit for water supplied to a humidifier in which the water is broken into a spray and thereupon distributed in the enclosure by suitable air currents produced by a fan, or otherwise, such for example as that illustrated in the patent to William B. Hodge, No. 1,540,335, granted June 2, 1925, or a conduit for air under pressure supplied to a series of atomizing heads such as that disclosed in the patent to Albert W. Thompson, No. 869,945, granted November 5, 1907, or other usual types of moisture supplying means.

The mechanism for controlling the valve, or other device, for regulating the supply of moisture, desirably comprises a pneumatically operable diaphragm motor or motors, but other suitable types of motors may be employed including pneumatic, hydraulic, and electric, as will be obvious to those skilled in the art who are familiar with motors of these various types employed in humidity regulation. It will, therefore, be understood that the pneumatically operated diaphragm motors which are shown in the accompanying drawings are illustrative of certain means which may be employed to accomplish the purpose of the invention and are not restrictive of the scope of the invention or of the claims.

In the preferred embodiments of the invention illustrated in the accompanying drawings, Fig. 1 is a view, largely in diagrammatic form, of a humidity regulating system embodying the invention;

Fig. 2 is a detail view, mainly in vertical section, of a relay valve employed in the system;

Fig. 3 is a detail plan view showing a preferred form of port and valve operable by the regulator for actuating the moisture controlling mechanism;

Figure 5:
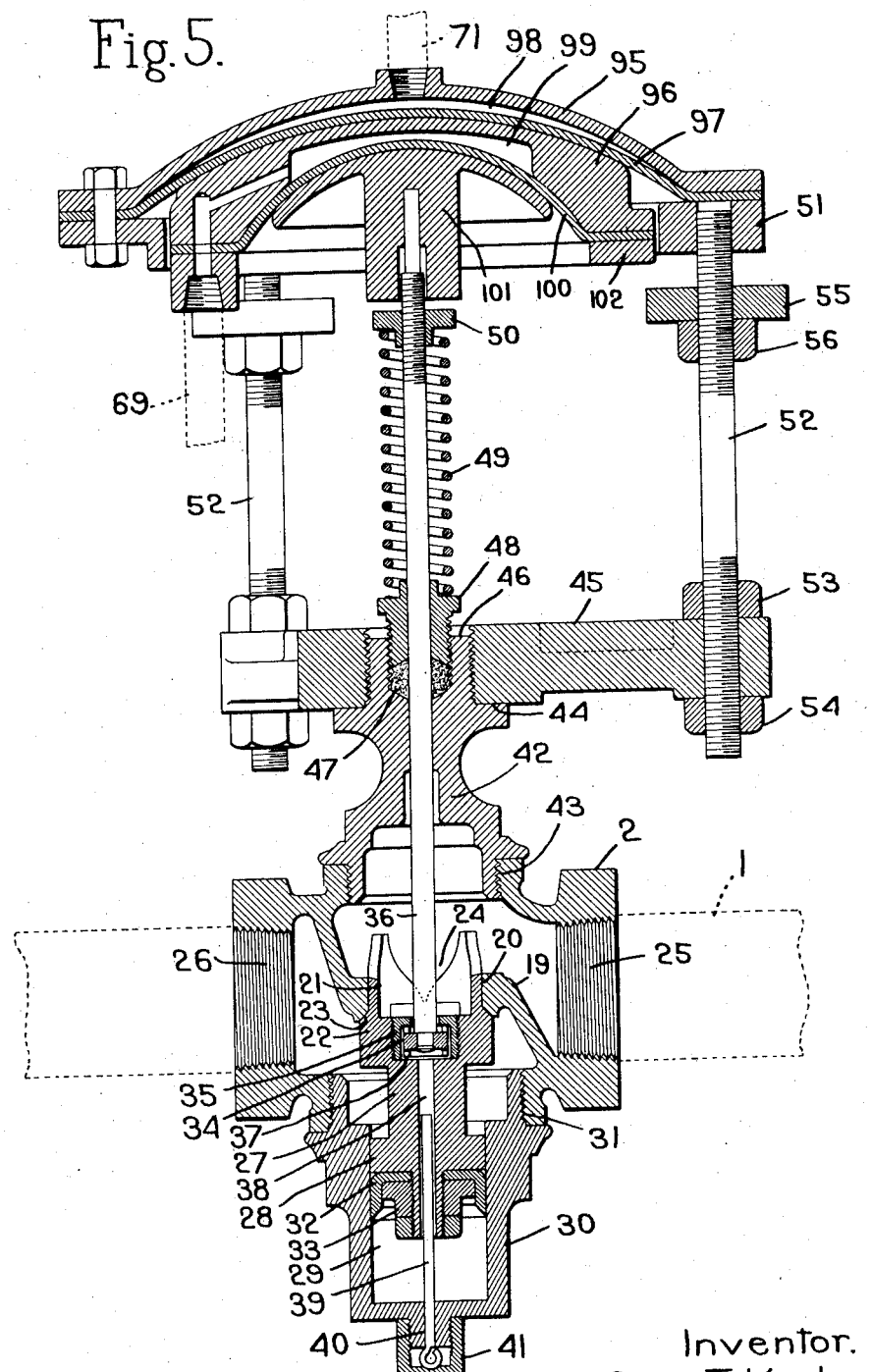
Figure 6:
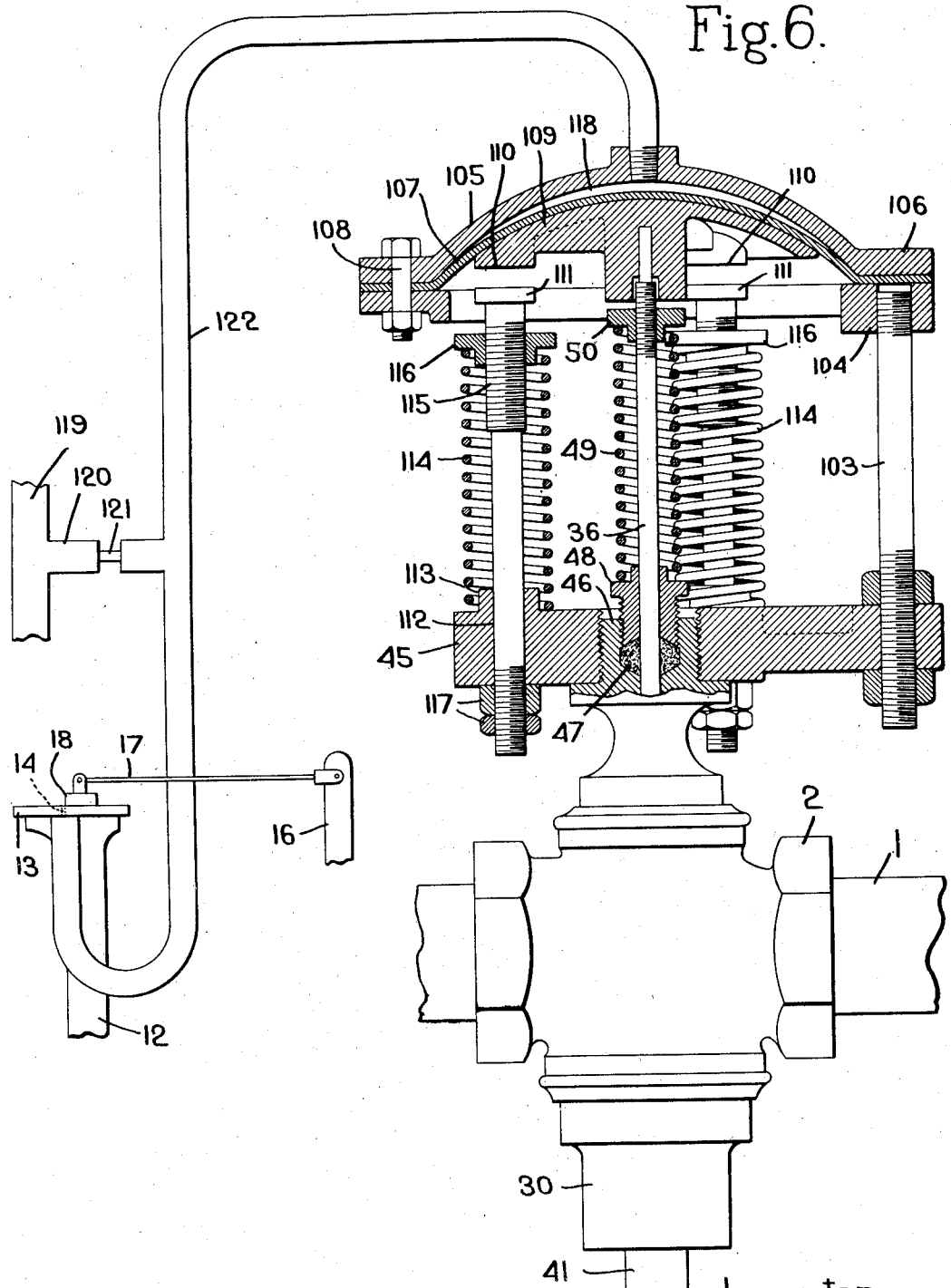

Fig. 5 is a similar view in which the diaphragm of the primary pneumatic motor is of greater area than the diaphragm of the secondary pneumatic motor; and, Fig. 6 is a view, partially in vertical section, of a different embodiment of the invention, in which a single diaphragm motor is employed, but so arranged and controlled as to actuate the valve in successive stages, first, to open the valve to a predetermined setting to supply moisture at a substantially constant rate, and thereafter gradually to open more fully in response to a greater deficit of humidity than can be compensated by the moisture supplied at said constant rate.

In the humidifying system illustrated in Fig. 1 of the drawings the moisture supplying system comprises a conduit 1, which may either supply water under pressure to a suitable spray-producing means, or air under pressure to one or more atomizing or vaporizing devices as is well known in the art, the amount of moisture supplied being controlled by a valve contained in a valve casing 2 forming a part of said conduit and the actuation of the valve being controlled by a suitable regulator 3 which, as diagrammatically illustrated herein, is of the well known "Parks-Cramer" type. Other types of regulating means, however, may be employed as will be obvious to those skilled in the art.

The regulator 3, which is illustrated herein, comprises a casing 4 having a wet bulb compartment 5, and a dry bulb compartment 6 containing respectively thermo-expansible devices subject respectively to the wet and dry bulb temperatures of the air, the thermo-expansible member in the wet bulb compartment desirably being subject to the psychrometric wet bulb temperature of the air.

In the construction illustrated an atomizer 7 delivers a spray of water into the wet bulb compartment 5 and saturates the air therein. The action of the spray induces a sample current of air from the room through a screened inlet opening 8 into the dry bulb compartment 6, thus subjecting a thermo-expansible element 9, which is located in the dry bulb chamber 6, to the dry bulb temperature of the sample of air. The air then flows through an aperture 10 in the partition dividing the wet bulb compartment from the dry bulb compartment, into the wet bulb compartment where it is saturated and the wet bulb thermo-expansible element 11 in said chamber subjected to the psychrometric wet bulb temperature of the air. The wet and dry bulb thermo-expansible members may be of like form and comprises a plurality of associated cells containing a thermo-expansible or volatile fluid. The dry bulb thermo-expansible member 9 acts upon the lower end of a lever 12, the upper end of which is provided with a valve seat 13 having a port 14 therein which communicates with a pipe 15 leading to the controlling device which will hereinafter be described. The wet bulb thermo-expansible element 11 likewise acts upon the lower end of a lever 16, the upper end of which is pivotally connected to one end of a link 17, the opposite end of which is connected to a valve 18 which rests upon the valve seat 13 and cooperates with the port 14 therein.

The regulator construction is of a well known type and need not be further described. In its operation uniform and equal expansion or contraction of both wet and dry bulb members, due to changes in temperature, will not affect the relative positions of the valve 18 and valve port 14. When, however, the wet and dry bulb members are subjected to varying temperatures produced by variations in the condition of humidity of the air, one of the thermo-expansible members will expand or contract at a greater rate than the other, thereby causing relative movement therebetween which will move the valve 18 relatively to the valve seat to open or to close the port therein in accordance with such changes in the condition of humidity.

A decrease in the temperature of the wet bulb element relatively to that of the dry bulb element, will cause the upper ends of the levers 12 and 16 to approach each other, thereby moving the valve 18 and valve seat 13 relatively in directions to close the port 14, while a relative increase in the temperature, to which the wet bulb member is subjected, will cause a separation of the upper ends of the levers 12 and 16, thereby moving the valve and valve seat in directions to open the port 14.

Figure 4:
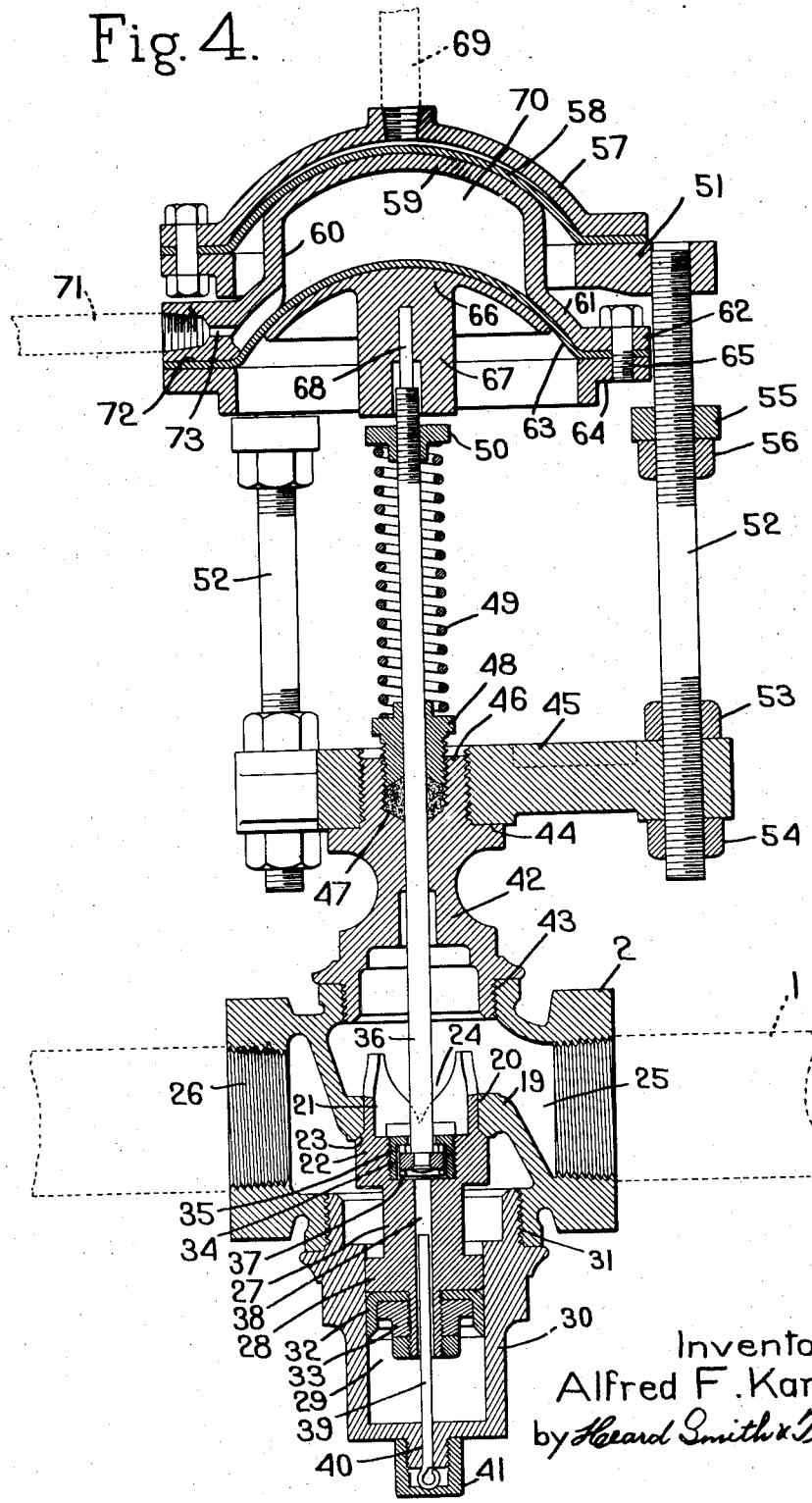
Fig. 4 is a longitudinal sectional view of the valve for controlling the moisture supply and a plurality of pneumatically operated diaphragm motors for actuating the valve in accordance with the invention.

The relative movements of the valve 18 and port 14 are employed to control the action of pneumatic motors which actuate the valve in the valve casing 2 of the moisture supplying means. In the valve actuating mechanism, which is illustrated in Fig. 4, the valve casing 2 is provided with a diagonally extending partition 19 having a central cylindrical opening 20 to receive the cylindrical portion 21 of a controlling valve having an enlarged head 22 with a beveled shoulder 23 adapted to engage a complementary beveled valve seat on the under side of the partition 19. The walls of the cylindrical portion of the valve desirably are provided with a plurality of re-entrant recesses 24, such that when the valve is depressed so that the lower portions of the re-entrant recesses extend below the valve seat 23, fluid will flow from the inlet end 25 of the valve casing through the port in the partition and to the outlet end 26 of the valve casing.

The head 22 of the valve desirably is provided with a downwardly extending stem 27 having at its lower end an enlarged portion forming a piston 28 which is reciprocably mounted in a cylindrical chamber 29 of a dash pot 30, the wall of which is provided with a screw threaded coupling 31 adapted to engage a complementary screw threaded coupling in the valve casing 2. The piston 28 is provided with a central screw threaded extension and a leather, or other flexible packing 32 is clamped upon the lower face of the piston by a nut or nuts 33.

Means are provided to permit the fluid to flow from the inlet portion of the casing through the valve into the chamber 29 of the dash pot. As illustrated herein the head 22 of the valve has a central cylindrical recess provided with a screw threaded wall 34 which is engaged by a screw threaded hollow plug 35 having an inwardly extending flange at its upper end which loosely surrounds the valve stem 36. A collar 37 is secured upon the lower end of the valve stem 36 and is of slightly smaller diameter than the internal diameter of the plug 35. Desirably opposite faces of the collar 37 are grooved transversely to permit the fluid to pass around it. The head and stem of the valve are bored axially to provide a conduit 38 leading to the chamber 29 of the dash pot so that the fluid may flow from the inlet portion 25 of the valve casing downwardly through the valve and the conduit 38 into the chamber 29 of the dash pot. The passage thus formed is somewhat restricted so that the downward movement of the valve will be cushioned and an abrupt or hammering movement thereof avoided.

A rod 39, of suitable diameter, to produce a proper restriction of the flow of fluid from the dash pot, upon downward movement of the valve, may extend into the conduit 38 and also may project through a suitable screw threaded extension 40 of the dash pot and rest upon a cap 41 secured thereto. The cap 41 may be removed and the rod 39 withdrawn for the purpose of cleaning the chamber 39 of the dash pot of any sediment which may deposit therein.

The valve stem 36 extends upwardly through a central passage and bearing in a standard 42 having at its lower end a screw threaded connection 43 with the valve casing. The upper end of the standard 42 is enlarged to form a seat 44 for a base 45 to support the diaphragm motor. The standard also is provided with a hollow screw threaded extension 46 adapted to receive a packing 47 which may be crowded into the cavity of the extension by a suitable screw threaded plug 48, the upper end of which is provided with a seat for the valve spring 49. The upper portion of the valve stem is screw threaded to receive a nut 50 which may be adjusted thereon to vary the tension of the spring 49 which acts normally to retain the valve 20 in seated position, and to vary the gradual actuation thereof.

Various types of motors controlled by the regulating means as aforesaid may be employed for actuating the valve in the manner heretofore described. Suitable pneumatically operated diaphragm motors are illustrated in Figs. 4, 5, and 6, which are adapted for this purpose.

In the construction illustrated in Fig. 4 a primary and a secondary motor are shown which are arranged to act upon the valve stem in tandem. The primary motor comprises a plate 51, of substantially annular form, preferably having three equally spaced laterally extending bosses which are connected by screw threaded spacing rods 52 with the base 45. The lower ends of the rods 52 are adjustably secured upon the base 45 by nuts 53 and 54 upon the rod engaging respectively the under and upper faces of the base 45. Stop collars 55, to limit the movement of the piston of the primary motor for purposes hereinafter to be described, are adjustably secured upon the rods 52 by nuts 56. The casing 57 of the primary motor, which desirably is of concave form, is suitably bolted to the base plate 51 of the motor with the periphery of a flexible diaphragm 58 therebetween.

The motor is provided with a hollow piston having a wall 59 which desirably is substantially complementary to the curvature of the casing 57. This concave portion merges into a peripheral cylindrical wall 60 having an outwardly flared skirt 61 which terminates in a horizontal flange 62 and forms the casing of the secondary motor. The diaphragm 63 of the secondary motor is clamped between the flange 62 and a clamping ring 64 by a series of bolts or screws 65. The periphery of the clamping ring 64 extends over the stop collars 55 so that the movement of the piston 59 of the primary motor is limited. The piston 66 of the secondary diaphragm motor desirably is spherically convex and engages the diaphragm 63. As illustrated it is provided with a downwardly extending central stem 67 which is provided with an axial socket which receives an extension 68 of the valve stem.

Air under pressure is introduced into the chamber of the primary motor through a conduit or pipe 69 and air under pressure is introduced into the chamber 70 of the secondary motor through a conduit or pipe 71 which is tapped into a boss 72 extending laterally from the flange 62 and provided with a port 73 communicating with the chamber 70.

In the operation of the device air under pressure, under the control of the regulator, is first introduced into the chamber of the primary motor and acts to force the piston 59, which constitutes the casing of the secondary motor, downwardly until the lower edge of the ring 64 of the secondary motor engages the stop collars 55. Thus the valve is depressed to a predetermined limit. By reason of the recesses 24 in the cylindrical wall of the valve a predetermined flow of fluid through the conduit 1 to the humidifying device is permitted. By reason of the limitation of the movement of the valve by the stop collars 55, moisture is supplied to the room when the primary valve alone is actuated at a substantially constant rate. When sufficient moisture is supplied to compensate the deficit of humidity of the air, the regulator arms will be caused to separate, thereby withdrawing the valve 18 and opening the port, thus releasing the pressure in the motor and permitting the spring 49 to close the moisture controlling valve. By proper setting of the stop collars 55 a sufficient amount of moisture may be supplied to compensate a deficit of moisture in the atmosphere within a predetermined limit. The amount of moisture thus supplied at a constant rate may be varied by adjustment of the stop collars 55 upon the rod 52 so that different predetermined limits may be provided for the constant rate of moisture supply produced by the actuation of the primary valve. If the moisture supply thus produced is insufficient to compensate the deficit of humidity of the air in the enclosure, air under pressure may be introduced through the pipe 71 into the chamber 70 of the secondary valve, thereby actuating the piston 66 further to open the valve and thereby increase the supply of moisture.

Desirably air is introduced into the chamber 70 of the secondary valve at a progressively increasing pressure so that the actuation of the valve by the secondary motor is gradual, thereby permitting the amount of moisture delivered to the atmosphere to be gradually increased in correlation to an increasing deficit of humidity beyond the predetermined limit from the desired condition of humidity.

The mechanism for controlling the introduction of air under pressure to the primary and secondary motors, illustrated in Fig. 1 of the drawings, comprises a conduit 74 for air under pressure from a suitable source which has a branch 75 leading to a relay 76 having a valve which normally is closed, but which when opened will permit the air to enter the pipe 69 which leads to the chamber of the primary motor. A branch 77 from the conduit 74 containing air under pressure is provided with a restriction 78 and leads to a pipe 79 which communicates at its lower end with the port 14 of the regulator and at its upper end with a chamber of the diaphragm motor 80 of the relay 76. The pipe 71, which communicates with the chamber 70 of the secondary motor, communicates also with the pipe 79 leading from the regulator to the motor 80 of the relay 76. The relay 76 is illustrated in detail in Fig. 2 and comprises a casing having an inlet 81 which is connected to the branch 75 from the conduit containing air under pressure. The inlet 81 leads to a chamber 82 which communicates with an axial passage 83 in the casing having a laterally extending duct or conduit 84 which communicates with the pipe 69 which leads to the chamber of the primary diaphragm motor. A conical valve 85 is normally held seated upon the inlet end of the passage 83 by a helical spring 86 which abuts at one end against the valve and at its opposite end against the stem of a screw plug 87 which closes the end of the relay casing.

A small valve stem 88 of much smaller diameter than that of the aperture 83 extends from the valve 85 through the aperture and engages and enters into the piston rod 89 of the relay motor. The end of the piston rod is of conical form and provides a valve 90 which is adapted to seat upon the wall at the opposite end of the aperture 83. A port 91 communicates with the chamber of the piston rod 89 and is adapted to release the pressure in such chamber when the valve 90 is unseated, as illustrated in Fig. 2. The valve 90 is normally retained in unseated position by a spring 92 which is interposed between the relay casing and the piston of the motor which engages the diaphragm 93 of the relay motor 80.

By reason of this construction when air pressure is built up in the chamber of the diaphragm motor 80 the piston rod 89 will be moved longitudinally so that the valve 90 engages its seat at the end of the aperture 83. This movement of the piston, acting through the valve stem 88, unseats the valve 85 from the wall at the opposite end of the aperture and permits air to flow from the branch pipe 75 through the aperture 83 into the pipe 69, and thence to the chamber of the primary diaphragm motor. When the air pressure in the motor 80 is released the spring 92 will return the valve 89 to its normal position, illustrated in Fig. 2, thereby enabling the valve 85 to be seated by the spring 86, thus cutting off the supply of compressed air to the pipe 69. When the piston 89 is thus moved to normal position the valve 90 is removed from its seat and air permitted to escape from the chamber of the primary motor through the pipe 69, the aperture 83, and port 91, thereby enabling the spring 49 upon the valve stem of the moisture controlling valve to close the valve.

In the operation of the system the levers 12 and 16 of the regulator are adjusted by usual mechanism, (not shown), in such a manner as to maintain the valve 18 out of registry with the port 14 when the humidity of the room, or the enclosure, equals or exceeds a desired constant condition of humidity. When the humidity of the enclosure falls below said predetermined condition of humidity, the relative expansion of the wet and dry bulb thermo-expansible elements 9 and 11 will move the valve in a direction to close the port 14, thereby building up pressure in the pipe 15 and actuating the relay motor 80 in such a manner as to open its valve and permit air to flow from the branch 75 through the relay to the pipe 69, and thence to the chamber of the primary motor. This will operate the primary motor to force the moisture controlling valve to partially open position, which partially open position is determined by the position of the stop collars 55 upon the rods 52. A fraction of the available supply of moisture is thereupon promptly supplied to the enclosure at a predetermined uniform rate sufficient to compensate a deficit of humidity within a predetermined limit from the constant condition of humidity, desired to be maintained.

In usual constructions the relative movement of the valve and port are such as completely to close the port 14. In the present construction the valve 18 is desirably provided with an inclined edge 94 which gradually closes the port 14, thus causing pressure gradually to be built up in the pipe 79. Such gradual building up of pressure, however, will actuate the diaphragm motor only when a sufficient pressure is built up to overcome the tension of the spring 92 and the valve of the relay will be opened comparatively quickly. The pressure of the restricted air in the pipes 79 and 71, which is required to operate the relay motor 80, is insufficient to actuate the secondary motor, so that the primary motor will be given its full limited movement by the pressure of the air which passes through the branch 75, the relay 76, and the pipe 69, this pressure being considerably greater than the restricted pressure in the pipes 79 and 71.

Upon a continued or increasing deficit of moisture beyond that which may be compensated by the constant supply of moisture within the predetermined limit provided for by the actuation of the primary motor, a continued relative movement between the wet and dry bulb thermo-expansible members 9 and 11 will be produced which will cause the valve 18 gradually more completely to close the port 14, thereby building up greater pressure in the pipes 79 and 71. The pressure thus gradually built up will gradually actuate the piston of the secondary motor, thereby progressively opening the valve 20 which controls the supply of moisture to compensate for the continued or increasing deficit of humidity beyond said predetermined limit. The gradual movement of the moisture controlling valve thus produced by the secondary motor will ordinarily cause an increasing supply of moisture in correlation to the increasing deficit of moisture, so that in the practical operation of the device a substantially uniform predetermined condition of humidity will be maintained, notwithstanding wide variations in the demand for moisture to maintain the desired predetermined condition of humidity. The present invention, therefore, provides means for controlling the moisture supplying means operable by the regulating means to supply moisture to the air at a predetermined but adjustable rate sufficient to compensate a deficit of humidity from a desired condition of humidity within a predetermined limit, and means also operable by said regulating means thereafter to increase the moisture supply to compensate a deficit of humidity exceeding said predetermined limit.

A modified form of the invention is illustrated in Fig. 5, which provides for a gradual regulation within a predetermined limit from the desired condition of humidity and where a deficit of humidity exists beyond said predetermined limit to supply moisture at a substantially uniform rate, and preferably of the full capacity of the moisture supplying system. In the construction disclosed in Fig. 5, the primary motor is of larger area and capacity than the secondary motor and is so connected to the regulator that upon detection of a deficit of humidity pressure will be gradually built up in said primary motor until a predetermined limit is attained, and the moisture supplying valve thereby partially opened to a predetermined setting to supply moisture at a uniform rate. If the deficit of humidity exceeds said predetermined limit, air under pressure is supplied to the secondary motor, preferably through the relay, thereby further opening the valve, preferably to its full capacity. As the moisture deficit is compensated in either case the regulator will be actuated in the opposite direction, first, acting through the relay to relieve the pressure in the chamber of the secondary motor and at once reduce the moisture supply to the predetermined fraction of the available moisture supply, and thereafter gradually to relieve the pressure in the primary motor, so as to avoid supplying any substantial excess of moisture to the air above that which is required to maintain substantially the desired constant condition of humidity.

In the construction disclosed in Fig. 5, the moisture supplying conduit, the valve casing, the moisture supplying valve, the standard, the base which supports the diaphragm motors, the rods extending upwardly therefrom, the ring upon which the diaphragm of the primary motor is clamped, and the means for limiting the movement of the piston of the primary motor may be, and desirably are, of the same construction as in Fig. 4, and are indicated in Fig. 5 of the drawings by the same numerals and, therefore, need no further description.

The base 45 and the ring 51, however, desirably are of larger diameter to provide for an enlarged casing 95 for the primary motor. The outer face of the piston 96 of the primary motor, which engages the diaphragm 97 thereof, conforms substantially to the casing, but is separated therefrom to provide a chamber 98 to receive air under pressure. The chamber 99, which lies between the piston 96 and the diaphragm 100 of the secondary motor, is of much smaller capacity because the diaphragm 100 is of much less diameter than that of the primary motor. The piston 101 of the secondary motor is provided with a downwardly extending central stem which receives and engages the end 68 of the valve stem 36, as heretofore described.

In this construction air under pressure is introduced to the chamber 98 of the primary motor through the pipe 71, while air under pressure is introduced into the chamber 99 of the secondary motor through the pipe 69 which is controlled by the regulator in the manner heretofore described in respect to Figs. 1 to 4 of the drawings.

In the operation of the device a deficit of humidity will move the valve 18 of the regulator in a direction to close the port 14 in the manner aforesaid. This will gradually build up pressure in the pipe 79 and in the pipe 71 which communicates with it, and consequently will build up a pressure in the chamber 98 of the primary motor, thus forcing the piston of the primary motor downwardly until the ring 102 upon said piston engages the stops 55. When the piston of the primary motor is thus arrested, the valve will be maintained partially open at a predetermined setting, and will supply moisture to the air at a substantially constant rate which is a predetermined fraction of the available moisture supply. As the deficit of humidity is compensated the regulator valve will gradually open the port 14, thereby gradually closing the valve, so that moisture will be supplied at a rate correlated to the demand for moisture to maintain the predetermined constant condition of humidity. If, however, a greater deficit of humidity exists than can be compensated by the supply of moisture when the valve has been opened to the predetermined setting, the relative movements of the wet and dry bulb elements will cause the valve 18 more completely to close the port 14, thereby building up still further pressure in the pipe 79. When the pressure thus built up is sufficient to actuate the motor 80, the relay valve will be opened and air under pressure supplied through the pipe 75, the relay 76, and the pipe 69 to the chamber 99 of the secondary motor. As the pressure of the air thus supplied is considerably greater than that which is built up in the pipes 79 and 71, the piston 101 of the secondary motor will be actuated rapidly to open the valve which controls the moisture supply, preferably to the full capacity of the moisture supplying system. The relative areas of the diaphragms of the primary and secondary motors are such that the increasing pressure, which is thus supplied to the secondary motor, will not be sufficient to overcome the action of the primary motor, thus the moisture supplying valve will be retained open to supply moisture to the full capacity of the system until the moisture supply reduces the deficit of humidity within the predetermined limit, whereupon the regulator will act to cause the valve 18 partially to open the port 14, thus releasing the pressure in the chamber of the secondary motor and permitting the spring 49 to restore the valve to the predetermined, partialy open, setting, and the valve will thereafter be under the gradual control of the primary motor as heretofore described.

From the constructions shown in Figs. 4 and 5 respectively, it will be obvious that the supply of air under pressure to either the primary or secondary motor or both, may be controlled by a relay to provide prompt actuation of the controlling valve to supply moisture at a uniform rate, whether such uniform rate of supply is the full capacity of the moisture supply, or a predetermined fraction thereof.

In Fig. 6 of the drawings a different embodiment of the invention is disclosed which comprises a single motor having means for limiting the movement thereof to open the moisture supplying valve quickly to a predetermined position and which will open the valve more gradually against the resistance of resilient means if the deficit of humidity of the atmosphere continues or increases beyond a predetermined limit from the desired constant condition of humidity.

In the construction disclosed in Fig. 6, the moisture supplying means, the valve controlling the moisture supplying means, the valve casing, the standard mounted upon said casing, and the base which supports the diaphragm motor, are illustrated as of the same construction as that disclosed in Fig. 4. In this construction, however, the rods 103, which support the ring 104 of the motor casing, are not provided with stops. The motor comprises a concave casing 105 of spheroidal form having a flange 106 which extends parallel to the ring 104 and the periphery of the diaphragm 107 is clamped therebetween by bolts 108. The piston 109 of the motor is mounted on the valve stem and has a spheroidal surface substantially complementary to the curvature of the casing, and is provided with downwardly extending lugs or shoulders 110 which are adapted to engage the heads of bolts 111 which extend downwardly through and are reciprocably mounted in suitable bearings or guideways 112 in the base 45 which supports the motor. The base desirably is provided with upwardly extending bosses 113 which surround and form a part of the bearings 112 and helical springs 114 are mounted upon the base, encircling said bosses and the bolt 111. The upper portion 115 of the bolt 111 desirably is of somewhat larger diameter than the main portion of the bolt stem and is screw threaded, and a nut or collar 116 is adjustably mounted upon the screw threaded portion 115 of the bolt. By rotating the screw threaded collar 116, the pressure of the spring 114 may be varied. The lower end of the bolt 111 is also screw threaded and is provided with nuts 117 to limit the upward movement of the bolts caused by the action of the spring 114. Desirably three of such bolts are provided and located equal distances apart, although it is obvious that a greater or lesser number may be employed.

In the operation of the device introduction of air under pressure into the chamber 118 of the motor will force the piston 109 of the motor downwardly until the faces of the lugs 110 engage the heads of the bolts 111, thus opening the valve to a predetermined setting. Further building up of air pressure in the chamber 118 will gradually force the bolts downwardly against the action of the springs 114 thereby further opening the moisture supplying valve gradually in correlation to the pressure which is built up in the chamber 118.

In this construction a modified means for controlling the action of the motor is provided. The conduit 119, which supplies air under pressure, is provided with a branch 120, having a restriction 121 therein, which leads to a pipe 122 which communicates at one end with the chamber 118 of the motor and at its opposite end with a port 14 in the valve seat 13 carried by the lever 12 of the regulator which is operated by the dry bulb thermo-expansible member of a regulator which may be identical in construction with the regulator illustrated in Fig. 1. The valve 18 of the regulator, which desirably has an inclined forward edge 94 as heretofore described, co-operates with a valve port 14 and is connected by a suitable link 17 to the lever 16 of the regulator which is actuated by the wet bulb thermo-expansible element.

In the operation of the device relative movements of the levers 12 and 16 toward valve-closing position gradually restrict the flow of air under pressure through the port 14, thereby causing pressure to be built up in the pipe 122 and the chamber 118 of the motor. This building up of pressure forces the piston 109 downwardly until the lugs 110 engage the heads of the bolts 111, thus opening the valve to a predetermined position. To build up such pressure it is only necessary that the valve 18 partially closes the port 14.

By reason of this construction the valve 18 is actuated gradually and the pressure upon the diaphragm, therefore, gradually varied to open and close the valve, even in the first stage, thereby gradually compensating a deficit of humidity within such predetermined limit as is established by the position of the heads of the bolts 111. When sufficient pressure is built up in the motor chamber 118 to cause the lugs 110 to engage the heads of the bolts 111, a constant supply of moisture will be maintained until sufficient pressure is built up in the motor chamber 118 to overcome the initial resistance of the springs 114, so that during such period the valve remains open to a predetermined setting and will supply moisture to the air at a substantially constant rate. When a continued or increasing deficit of humidity exists beyond said predetermined limit of humidity, the valve 18 will further gradually close the port 14, thereby increasing the pressure in the chamber 118 and will gradually open the moisture supplying valve further against the pressure of the springs 114. The instrument, therefore, will operate in the manner heretofore described with respect to the preceding figures of the drawings, with the exception that in Fig. 6 a more gradual initial actuation of the diaphragm will be produced than in the case in which the initial actuation is only caused after the building up of sufficient pressure under the control of the regulator to actuate the relay motor. By adjusting the nut 50 the tension of the spring 49 may be varied in any of the constructions above described in such a manner as to decrease or increase the rate at which the valve is gradually opened by the action of the motor.

By virtue of the present invention the supply of moisture to the air is so regulated that the desired constant condition of humidity is more accurately maintained. Furthermore, an excessive supply of moisture over that which is required to maintain the desired condition of humidity is avoided. Usual systems provide for supplying moisture at a constant maximum capacity and when the regulating means, upon detection of a deficit of humidity below the desired condition of humidity, calls for moisture, the moisture supplying device is turned on to its full capacity until such deficit of humidity is compensated. The time-lag required for the action of the regulator to shut off the supply of moisture results in over-humidification. The present invention provides means for supplying moisture at a constant rate much less than the full capacity of the moisture supplying system and the moisture supplied during the time-lag is correspondingly reduced, so that over-humidification is substantially avoided. Furthermore, the adjustability of the limit for supplying moisture at a predetermined rate is such as readily to vary the limit of the moisture control effected by the primary motor to suit such conditions as may be present. In addition the system is always in condition to supply moisture to the full capacity of the moisture supplying system in response to demand therefor.

By virtue of the present invention, therefore, mechanism is provided to compensate for the moisture deficit of the air throughout such wide variations as occur at different seasons of the year, as well as such changes as occur during each season, and such variations as occur throughout the days of the season. For example, in winter months, when the air is dry and heat from the machinery is partially compensated by the heat loss through the building walls, the demand for moisture to maintain a proper condition of humidity is far less than on a dry summer day in which the heat of the sun upon the roof and walls add to the heat from the machinery. In such case the present invention provides means for supplying moisture at a rate much less than the maximum capacity of the system to compensate for smaller deficits of humidity, while at the same time the regulating mechanism is such that the full capacity of the system may at any time be utilized. Consequently the system is such that it is adapted to supply the required amount of moisture in response to any demand of humidity, irrespective of the natural atmospheric condition, at any season of the year.

It will thus be seen that the invention may be embodied in apparatus comprising a single motor or a plurality of motors and it will be obvious that such motors may be arranged in various manners, that instead of having the motors arranged in tandem, as illustrated in Figs. 4, and 5, the motors may be independently mounted and the moisture controlling valve operated through suitable lever mechanism, or the valve stem may be extended through the opposite side of the valve casing and one of the motors applied thereto to operate upon the valve in conjunction with or in opposition to the actuation of the other motor. It will also be obvious that various types of regulators may be employed, as heretofore mentioned, and that various changes in design, construction and arrangement of parts may be made within the spirit and scope of the following claims.

Having thus described the invention, what is claimed as new, and desired to be secured by Letters Patent, is:

1. A humidifying system comprising means for supplying moisture to the air, regulating means responsive to variations in the moisture content of the air, means for controlling said moisture supplying means operable by said regulating means to supply a predetermined fraction of the available supply of moisture to compensate a moisture deficit from a desired constant condition of humidity within a predetermined limit, and operable by said regulating means thereafter further to increase the supply of moisture in response to increasing moisture deficit beyond said predetermined limit.

2. A humidifying system comprising means for supplying moisture to the air, regulating means responsive to variations in the moisture content of the air, means for controlling said moisture supplying means operable by said regulating means promptly to supply a fraction of the available supply of moisture to compensate a moisture deficit from a desired constant condition of humidity within a predetermined limit, and means operable thereafter by said regulating means conjointly with said primary controlling means gradually to increase the supply of moisture in response to continued or increasing moisture deficit beyond said predetermined limit.

3. A humidifying system comprising means for supplying moisture to the air, regulating means responsive to variations in the moisture content of the air, primary means for controlling said moisture supplying means operable by said regulating means promptly to supply a predetermined fraction of the available supply of moisture to the air at a predetermined substantially uniform rate sufficient to compensate a deficit of humidity from a desired constant condition of humidity within a predetermined limit, and secondary means operable by said regulating means conjointly with said primary controlling means thereafter gradually to increase the supply of moisture to compensate a deficit of humidity exceeding said predetermined limit.

4. A humidifying system comprising means for supplying moisture to the air, regulating means responsive to variations in the moisture content of the air, means for controlling said moisture supplying means operable by said regulating means to supply a fraction of the available supply of moisture to the air at a predetermined substantially uniform rate sufficient to compensate a deficit of humidity from a desired constant condition of humidity within a predetermined limit, means for adjusting the rate of substantially uniform moisture supply, and means operable by said regulating means thereafter gradually to increase the supply of moisture in compensation of a deficit of humidity exceeding said predetermined limit.

5. A humidity regulating system comprising means for supplying moisture to the air, means for controlling said moisture supply, regulating means responsive to variations in the moisture content of the air, a plurality of actuating means operable singly and conjointly by said regulating means to actuate said controlling means to supply moisture to the air to compensate respectively deficits of moisture within and exceeding a predetermined limit from a desired constant condition of humidity.

6. A humidity regulating system comprising means for supplying moisture to the air, means for controlling said moisture supply, regulating means responsive to variations in the moisture content of the air, a plurality of actuating means operable singly and conjointly by said regulating means to actuate said controlling means to supply moisture to the air to compensate respectively deficits of moisture within and exceeding a predetermined limit from a desired constant condition of humidity, said regulator comprising means for causing a gradual movement of certain of said actuating means.

7. A humidifying system comprising means for supplying moisture to the air, a valve controlling the moisture supply, regulating means responsive to variations in the moisture content of the air, a plurality of valve-actuating motors operable by said regulating means singly and conjointly respectively to supply moisture to the air to compensate deficits of moisture within and exceeding predetermined limits from a desired constant condition of humidity.

8. A humidifying system comprising means for supplying moisture to the air, a valve controlling the moisture supply, regulating means responsive to variations in the moisture content of the air, a plurality of valve-actuating motors operable by said regulating means singly and conjointly respectively to supply moisture to the air to compensate deficits of moisture within and exceeding predetermined limits from a desired constant condition of humidity, comprising means for gradually actuating certain of said motors and means for adjusting said gradual actuation.

9. A humidifying system comprising means for supplying moisture to the air, a valve controlling the moisture supply, a primary and a secondary motor for actuating said valve, regulating means responsive to variations in the moisture content of the air, means operable thereby to cause the actuation of said primary motor to supply moisture to the air at a predetermined rate to compensate a deficit of humidity from a desired condition of humidity within a predetermined limit, and means operable by said regulating means thereafter to cause the actuation of said secondary motor, to increase the supply of moisture to the air in compensation of a deficit of humidity exceeding said predetermined limit.

10. A humidifying system comprising means for supplying moisture to the air, a valve controlling the moisture supply, a primary and a secondary motor for actuating said valve, regulating means responsive to variations in the moisture content of the air, means operable thereby to cause the actuation of said primary motor to supply promptly a predetermined fraction of the available moisture supply to the air at a predetermined rate to compensate a deficit of humidity from a desired condition of humidity within a predetermined limit, and means operable by said regulating means thereafter to cause the actuation of said secondary motor gradually to increase the supply of moisture to the air in correlation to, and in compensation of, an increasing deficit of humidity exceeding said predetermined limit.

11. A humidifying system comprising means for supplying moisture to the air, a valve controlling the moisture supply, a primary and a secondary fluid operated motor for actuating said valve, means for supplying fluid under pressure to said motors, a regulator responsive to variations in the moisture content of the air, means operable thereby in response to a deficit of humidity, within a predetermined limit from a desired constant condition of humidity, to cause said primary motor partially to open said valve to a predetermined setting, and means operable by said regulator in response to a deficit of humidity exceeding said limit to cause said secondary motor to open said valve further and thereby increase the supply of moisture to the air.

12. A humidifying system comprising means for supplying moisture to the air, a valve controlling the moisture supply, a primary and a secondary fluid operated motor for actuating said valve, means for supplying fluid under pressure to said motors, a regulator responsive to variations in the moisture content of the air, means operable thereby in response to a deficit of humidity, within a predetermined limit from a desired constant condition of humidity, to cause said primary motor partially to open said valve promptly to a predetermined setting, and means operable by said regulator in response to an increasing deficit in humidity beyond said predetermined limit to cause said secondary motor gradually to open said valve and thereby increase the moisture supplied to the air in correlation to, and in compensation of, said deficit of humidity.

13. A humidifying system comprising means for supplying moisture to the air, a valve controlling the moisture supply, a plurality of pneumatic motors for actuating said valve, means for supplying air under pressure to said motors, regulating means responsive to variations in the moisture content of the air, means operable by said regulating means to actuate said motors at different pressures one of said motors being operable partially to open said valve to supply moisture to the air to compensate a deficit of moisture, within a predetermined limit from a desired condition of humidity, and said motors being conjointly operable at a different pressure further to open said valve gradually to supply an increased amount of moisture to the air to compensate an increasing deficit of humidity beyond said predetermined limit.

14. A humidifying system comprising means for supplying moisture to the air, a valve controlling the moisture supply, a primary and a secondary pneumatic motor connected to said valve, means for limiting the movement of the valve caused by said primary motor, a source of air under pressure, a conduit for supplying air under pressure therefrom to one of said motors and having therein a relay valve provided with a pneumatic motor, a pipe leading from said source of air under pressure to said relay motor having a restriction therein, a conduit leading from said pipe to said secondary motor, a regulator responsive to variations in the moisture content of the air having a port communicating with the pipe leading to the relay motor, a valve co-operating with said port having means operable upon relative movement therebetween first partially to close said port and thereby cause the actuation of said relay to supply air under pressure to said primary motor partially to open said valve, and upon further relative movement of said valve and port to close said port and thereby cause the actuation of said secondary motor further to open said valve.

15. A humidifying system comprising means for supplying moisture to the air, a valve controlling the moisture supply, a primary and a secondary pneumatic motor connected to said valve, means for limiting the movement of the valve caused by said primary motor, a source of air under pressure, a conduit for supplying air under pressure therefrom to one of said motors and having therein a relay valve provided with a pneumatic motor, a pipe leading from said source of air under pressure to said relay valve having a restriction therein, a conduit leading from said pipe to said secondary motor, a regulator responsive to variations in the moisture content of the air having a port presenting relatively large and small outlet portions communicating with the pipe leading to the relay motor, a valve co-operating with said port having means operable upon relative movement therebetween first to close the larger outlet portion of said port and thereby cause the actuation of said relay to supply air under pressure to said primary motor partially to open said valve, and upon further relative movement of said valve and port gradually to close the smaller outlet portion of said port and thereby cause the actuation of said secondary motor further to open said valve gradually and thereby gradually to increase the supply of moisture to the air.

16. A humidifying device comprising means for supplying moisture to the air, a valve controlling the moisture supply having a valve stem, a primary and a secondary pneumatic motor arranged in tandem to act upon said valve, adjustable means for limiting the effective movement of said primary motor, a source of air under pressure, a conduit for supplying the air under pressure to said primary motor having therein a relay valve provided with a pneumatic motor, a pipe leading from said source of air under pressure to said relay motor having a restriction therein, a conduit leading from said pipe to said secondary motor, a regulator having a port communicating with said pipe, and a valve co-operating with said port having means operable upon relative movement therebetween, caused by variation in the moisture content of the air first partially to close said port and thereby cause the actuation of said relay to supply air under pressure to said primary motor partially to open said moisture controlling valve, and upon further relative movement therebetween gradually to close said port and thereby cause the actuation of said secondary motor further to open said valve gradually.

17. A humidifying system comprising means for supplying moisture to the air, a valve controlling the moisture supply having a valve stem, a primary and a secondary pneumatic diaphragm motor acting on said valve and arranged in tandem and having diaphragms of different effective areas, a source of air under pressure, a conduit for supplying air under pressure to said secondary motor having therein a relay valve provided with a pneumatic motor, a pipe leading from said source of air under pressure to said relay motor and having a restriction therein, a regulator responsive to variations in the condition of humidity of the air having a port communicating with said pipe, a conduit leading from said pipe to said primary motor, a valve cooperating with said port having means operable by relative movement therebetween, caused by said regulator, first, partially to close said port and thereby gradually to build up pressure in said primary motor, thus causing a gradual opening of said moisture controlling valve to a predetermined limit and upon further relative amendment therebetween acting to close said port, and thereby cause the actuation of said relay to supply air under pressure to said secondary motor fully to open said moisture controlling valve.

18. A humidifying system comprising means for supplying moisture to the air, regulating means responsive to variations in the moisture content of the air, means for controlling said moisture supplying means operable by said regulating means to compensate a moisture deficit from a desired constant condition of humidity within a predetermined limit, means operable thereafter by said regulating means gradually to increase the supply of moisture in response to continued or increasing moisture deficit beyond said predetermined limit, and adjustable means for varying the rate at which the supply of moisture is gradually increased.

19. A humidifying system comprising means for supplying moisture to the air, a valve controlling the moisture supply, a spring tending normally to close said valve, a primary and a secondary fluid operated motor for actuating said valve, means for supplying fluid under pressure to said motors, a regulator responsive to variations in the moisture content of the air, means operable thereby in response to a deficit of humidity, within a predetermined limit from a desired condition of humidity, to cause said primary motor partially to open said valve to a predetermined setting, means operable by said regulator in response to a deficit of humidity exceeding said limit to cause said secondary motor to open said valve against the pressure of said spring gradually to increase the supply of moisture to the air, and means for adjusting the tension of said spring to vary the rate at which the supply of moisture is gradually increased.

20. A humidifying system comprising means for supplying moisture to the air, a valve controlling the moisture supply, a spring tending normally to close said valve, a primary and a secondary fluid operated motor for actuating said valve, means for supplying fluid under pressure to said motors, a regulator responsive to variations in the moisture content of the air, means operable thereby in response to a deficit of humidity, within a predetermined limit from a desired condition of humidity, to cause said primary motor partially to open said valve to a predetermined setting, to supply moisture at a predetermined, substantially uniform rate. means for adjusting said predetermined setting to vary the amount of moisture supplied at said uniform rate, means operable by said regulator in response to a deficit of humidity exceeding said limit to cause said secondary motor to open said valve against the pressure of said spring, gradually to increase the supply of moisture to the air, and means for adjusting the tension of said spring to vary the rate at which the supply of moisture is gradually increased.

In testimony whereof, I have signed my name to this specification.

ALFRED F. KARLSON.